(12) United States Patent
Kawamura

(10) Patent No.: US 6,420,083 B1
(45) Date of Patent: Jul. 16, 2002

(54) PLANOGRAPHIC PRINTING PLATE PRECURSOR AND PROCESS FOR MANUFACTURING PLANOGRAPHIC PRINTING PLATE

(75) Inventor: Koichi Kawamura, Shizuoka-ken (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/553,050

(22) Filed: Apr. 20, 2000

(30) Foreign Application Priority Data

Apr. 21, 1999 (JP) ............................ 11-113336
May 24, 1999 (JP) ............................ 11-143886

(51) Int. Cl.$^7$ ............................ G03F 7/004
(52) U.S. Cl. .................. 430/270.1; 430/138; 430/302; 430/944; 430/945; 101/453; 101/463.1
(58) Field of Search .............. 430/138, 270.1, 430/302, 944, 945; 101/453, 465, 466

(56) References Cited

U.S. PATENT DOCUMENTS

| | | | |
|---|---|---|---|
| 2,764,085 A | | 9/1956 | Shoemaker et al. |
| 3,168,864 A | | 2/1965 | Brandl, Jr. et al. ...... 101/149.2 |
| 4,859,568 A | * | 8/1989 | Takeda et al. ............... 430/269 |
| 4,916,041 A | * | 4/1990 | Hasegawa et al. ........... 430/138 |
| 6,171,748 B1 | * | 1/2001 | Tanaka et al. ............... 430/138 |
| 6,190,831 B1 | * | 2/2001 | Leon et al. ............... 430/270.1 |

FOREIGN PATENT DOCUMENTS

| | | | |
|---|---|---|---|
| EP | 0949088 A1 | * | 10/1999 |
| FR | 1302109 | | 12/1962 |
| JP | 10-329443 | | 12/1992 |
| JP | 11-070756 A | * | 3/1999 |
| JP | 11-311861 A | * | 11/1999 |
| WO | WO98/29258 | | 7/1998 |
| WO | WO99/04974 | | 2/1999 |
| WO | WO99/11457 | | 3/1999 |

\* cited by examiner

*Primary Examiner*—Janet Baxter
*Assistant Examiner*—Barbara Gilmore
(74) *Attorney, Agent, or Firm*—Burns, Doane, Swecker & Mathis, LLP

(57) ABSTRACT

A planographic printing plate precursor is provided which includes a substrate having thereon an image recording layer containing a metal compound (I-a) which causes a decarboxylation reaction by heat and releases a polyvalent metal cation, and a hydrophilic polymer (I-b) which has two or more hydrophilic groups within the same molecule and can coordinate with the polyvalent cation. Also provided is a planographic printing plate precursor including a substrate having thereon an image recording layer containing a metal complex compound (II-a) and a hydrophilic polymer (II-b) which can coordinate with a metal generated from the metal complex compound by action of heat and which has two or more hydrophilic groups within the molecule and whose main chains are crosslinked.

20 Claims, No Drawings

PLANOGRAPHIC PRINTING PLATE PRECURSOR AND PROCESS FOR MANUFACTURING PLANOGRAPHIC PRINTING PLATE

BACKGROUND OF THE INVENTION

1. Field of the Invention

The present invention relates to a planographic printing plate precursor. More specifically, the present invention relates to a planographic printing plate precursor which has excellent sensitivity and can be used to manufacture a planographic printing plate directly by heating by a heating device such as a thermal head or by laser scanning on the basis of digital signals of a computer or the like. In addition, the present invention relates to a planographic printing plate precursor requiring no development processing, and a process for manufacturing a planographic printing plate which enables direct image formation by heat.

2. Description of the Related Art

In recent years, owing to the progress in technologies related to solid-state lasers and semiconductor lasers which emit rays in regions ranging from a near infrared region to an infrared region, systems, which use these infrared lasers, have been drawing attention as systems for direct planographic printing plate manufacturing in accordance with digital data of a computer.

Processes conventionally known as direct planographic printing plate manufacturing processes in which plates are manufactured from digitized image data without using a lithographic film include (1) an electrophotographic process; (2) a process using a high-sensitivity photopolymer which can be written with a blue-light or green-light-emitting laser of a relatively small output power; (3) a process using a silver salt or a combination of a silver salt and another system; and (4) a process in which heat-cured images are obtained by a post-heating process in the presence of an acid which is generated by heat mode laser exposure and acts as a catalyst.

Although these conventional processes are very useful in efficiently realizing the printing process, these conventional processes have not yet reached a completely satisfactory level and present the following problems.

First, image formation requires a huge amount of energy and a laser of a high output power because the materials used in the above-mentioned heat mode processes generally have low sensitivity. In addition, the processes are complicated because an additional thermal treatment is necessary after laser irradiation.

Secondly, despite their extreme usefulness in efficiently realizing the printing process, in addition to the problem that these processes are complicated or require large-scale equipment, these processes also have the following problems. Namely, these processes include a wet development step in which the recording layer formed on substrate surface is removed image-wise after an exposure step, and include a post-treatment step in which the printing plate which has been subjected to development is washed with water or is treated with a rinsing solution containing a surfactant or with a desensitizing solution containing gum arabic or a starch derivative. Therefore, a need exists for a planographic printing plate precursor which does not require the above-mentioned wet developing treatment and can be used directly for printing after exposure.

In view of the foregoing needs, in recent years, planographic printing plate precursors, which do not require complicated wet development processing and can be used directly in printing after exposure, have been developed.

As an example of a planographic printing plate precursor which does not require wet development processing, U.S. Pat. No. 5,258,263 discloses a planographic printing plate having a photosensitive hydrophilic layer whose curing or insolubilization is promoted in exposed regions, and a photosensitive hydrophobic layer, and both layers are laminated on a substrate.

This plate, however, is a so-called on-printer development type printing plate whose unexposed regions of the photosensitive layer are removed in a printing process. This plate has the drawback that dampening water and printing ink are contaminated at the time of manufacturing a planographic printing plate.

Japanese Patent Application Laid-Open (JP-A) No. 7-186, 562 (EP 652,483) discloses a planographic printing plate precursor containing a polymer, which generates a carboxylic acid by the action of heat and acid, and a dye capable of absorbing infrared rays. This planographic printing plate precursor does not require a development step because the plate precursor by itself is a hydrophobic recording layer which generates an acid by being heated to thereby hydrophilize the heated areas so that images are formed. However, this planographic printing plate precursor presents a problem in that stains are formed at the time of printing because the hydrophilized regions are not sufficiently hyrophilic.

On the other hand, JP-A No. 10-329,443 discloses a planographic printing plate precursor for imaging comprising a substrate having a hydrophilic surface and having thereon a photosensitive layer containing a metal chelate compound as a crosslinking agent. However, the sensitivity of this plate is insufficient, and therefore, an improvement of the sensitivity is required.

SUMMARY OF THE INVENTION

The first aspect of the present invention is a planographic printing plate precursor comprising a substrate having thereon an image recording layer containing a metal compound (I-a) which causes a decarboxylation reaction by heat and releases a polyvalent metal cation, and a hydrophilic polymer (I-b) which has at least two hydrophilic groups within the molecule and can coordinate with the polyvalent cation.

The second aspect of the present invention is a planographic printing plate precursor comprising a substrate having thereon an image recording layer containing a metal complex compound (II-a) and a hydrophilic polymer (II-b) which can coordinate with the metal generated from the metal complex compound by the action of heat and which has at least two hydrophilic groups within the molecule and whose main chains are crosslinked.

The third aspect of the present invention is a process for manufacturing a planographic printing plate, said process comprising the step of exposing a planographic printing plate precursor image-wise to infrared laser light so as to form a hydrophobic region on a surface of a planographic printing plate precursor, the planographic printing plate precursor being comprised of a substrate having thereon an image recording layer containing a metal complex compound (II-a) a hydrophilic polymer (II-b), which can coordinate with the metal generated from the metal complex compound by the action of heat and which has at least two hydrophilic groups within the molecule and whose main chains are crosslinked, and a substance (c) capable of converting light to heat.

DESCRIPTION OF THE PREFERRED EMBODIMENTS

The present invention is described in detail herein after.

The planographic printing plate precursor, which is the first aspect of the present invention, is explained.

The task of the present invention is to solve the above-mentioned existent problems and to achieve the following objects. That is, the first object of the present invention is to provide a planographic printing plate precursor which can be used to manufacture a planographic printing plate directly with excellent high sensitivity by heat generated either by a heating device or by a light-to-heat conversion action of laser light according to digital signals of a computer or the like.

After studies for the first object, the present inventors have found that the sensitivity of a planographic printing plate precursor can be further improved by use of a thermal decarboxylation-type metal compound which releases a polyvalent metal cation by causing a decarboxylation reaction when heated. Based on this discovery, they have established the first aspect of the present invention.

The planographic printing plate precursor as the first aspect of the present invention comprises a substrate having at least an image recording layer provided thereon, wherein the image recording layer contains a metal compound (I-a), which causes a decarboxylation reaction by heat and releases a polyvalent metal cation, a hydrophilic polymer (I-b) which has two or more hydrophilic groups within the molecule and can coordinate with the polyvalent metal cation, and other constituent components, if necessary.

As for processes for manufacturing a planographic printing plate according to the first aspect of the present invention, preferable are a process comprising irradiating a planographic printing plate precursor, comprised of a substrate having thereon an image recording layer containing a metal compound (I-a), which causes a decarboxylation reaction by heat and releases a polyvalent cation, a hydrophilic polymer (I-b), which has two or more hydrophilic groups within the molecule and can coordinate with the polyvalent metal cation, and a substance (c) capable of converting light to heat, with infrared rays image-wise and thereafter carrying out a developing treatment to remove the unirradiated regions by dissolution; and a process comprising irradiating a planographic printing plate precursor, comprised of a substrate having thereon an image recording layer containing a metal compound (I-a), which causes a decarboxylation reaction by heat and releases a polyvalent cation, a hydrophilic polymer (I-b), which has two or more hydrophilic groups within the same molecule and can coordinate with the polyvalent metal cation and whose main chains are crosslinked, and a substance (c) capable of converting light to heat, with infrared rays image-wise so that hydrophobic regions are formed on the surface.

The planographic printing plate precursor according to the first aspect of the present invention enables image formation by a heating device such as a thermal head. Further, the incorporation of a substance (c) capable of converting light to heat into the image recording layer of the planographic printing plate precursor enables image formation also by scanning with a laser such as an infrared laser.

Next, a planographic printing plate precursor, which is the second aspect of the present invention, is explained. The second object of the present invention is to provide a heat-sensitive recording type planographic printing plate precursor which can be used to manufacture a planographic printing plate directly with excellent high sensitivity according to digital signals of a computer or the like by heat generated either by a heating device or by a light-to-heat conversion action of laser light without necessitating a special treatment such as wet development or rubbing after image-wise exposure and also to provide a process for manufacturing a heat-sensitive recording type planographic printing plate using the planographic printing plate precursor. As a result of extensive studies to achieve the second object, the present inventors have found that the hydrophilic functional group of a hydrophilic polymer, whose main chains are crosslinked, interacts with a polyvalent metal chelate compound by chelate exchange and causes a crosslinking reaction and that this reaction deprives the resin having the hydrophilic functional group of the hydrophilicity and causes the change from hydrophilicity to hydrophobicity so that the wet development processing after exposure becomes unnecessary. Based on these findings, they have established the second aspect of the present invention.

According to the planographic printing plate precursor, which is the second aspect of the present invention, the hydrophilic group, which is contained in a hydrophilic polymer (II-b) having two or more hydrophilic groups within the molecule and having main chains crosslinked and which can coordinate with the metal generated from the metal complex compound by the action of heat, undergoes a crosslinking reaction by chelation with the metal released from a metal complex compound (II-a). The reacted region becomes a hydrophobic region having affinity for ink. On the other hand, a region free from the chelation maintains the surface property of the hydrophilic polymer to become a hydrophilic region to which dampening water adheres. Accordingly, a planographic printing plate, which can be used directly in printing without the employment of a development step, is manufactured.

Although the mechanism is not clear, it is believed that a metal complex compound (II-a) undergoes a crosslinking reaction by chelation with the two hydrophilic groups of a hydrophilic polymer (II-b), which can coordinate with the metal generated from the metal complex compound by the action of heat and has two or more hydrophilic groups within the molecule and whose main chains are crosslinked, in such a manner that the crosslinking reaction blocks the hydrophilic groups and the formation of the crosslinked structure deprives the hydrophilicity and water absorptivity of the heated region so that the heated region alone becomes a hydrophobic region.

In this case, the incorporation of a substance (c) capable of converting light to heat into the recording layer makes the recording layer writable with light such as an infrared laser.

Further, the incorporation of a thermoplastic polymer (d) into the recording layer enhances the hydrophobizing effect by thermal fusion and adhesion of the polymer. Furthermore, in order to strengthen the polarity change from hydrophilicity to hydrophobicity, it is preferable that a metal complex compound (II-a) is contained in a thermoplastic polymer (d), particularly in thermally fusible hydrophobic polymer particles as a specific form of the polymer.

The polymer having hydrophilic functional groups becomes hydrophobic by the formation of a complex with a polyvalent metal cation. The metal complex compound releases a metal when heated. According to the present invention, the metal complex compound present in the recording layer releases a metal when heated so that the metal thus generated undergoes a chelation reaction with the hydrophilic polymer to form a complex and hydrophobizes the polymer. As a result, the heated region alone becomes a hydrophobic region having affinity for ink while the rest of the region is hydrophilic. Therefore, a heat-sensitive recording type development treatment-free plate can be formed directly. Particularly because of the effect of the incorporation of a hydrophilic polymer (II-b) whose main chains are crosslinked, the planographic printing plate precursor according to the second aspect of the present invention can be used in printing directly by skipping the development step.

The combination of the first aspect and the second aspect of the present invention is particularly preferable from the standpoint of obtaining very good sensitivity and being usable in printing directly by skipping the development step.

The reaction mechanism of the hydrophobizing reaction by the metal complex compound in the first and second aspects of the present invention is schematically described below.

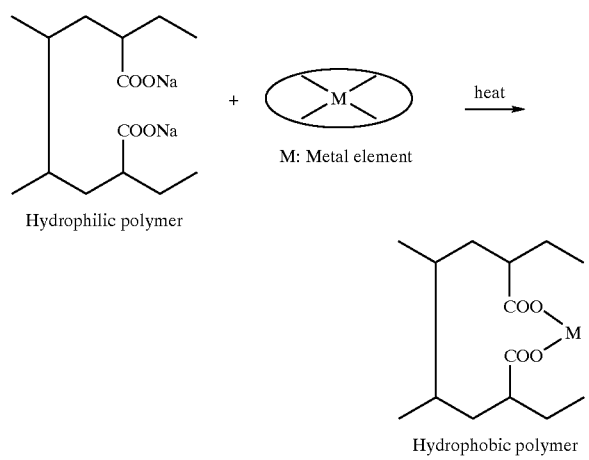

Next, the details of a planographic printing plate precursor as the first and second aspects of the present invention as well as the details of the process for manufacturing a planographic printing plate are given below.
<(I-a) A Metal Compound Which Causes a Decarboxylation Reaction when Heated and Releases a Polyvalent Metal Cation>

The metal compound, which is used in the first aspect of the present invention and which causes a decarboxylation reaction when heated and releases a polyvalent metal cation, is explained below.

The image recording layer of the planographic printing plate precursor of the first aspect of the present invention uses a metal compound (I-a) which causes a decarboxylation reaction when heated and releases a polyvalent metal cation (hereinafter referred to as a thermal decarboxylation-type metal compound (I-a) upon occasion).

When heated, the thermal decarboxylation-type metal compound (I-a) causes a decarboxylation reaction and releases a polyvalent metal cation. As illustrated in the example of reaction, the polyvalent cation forms a complex by causing a reaction replacing the monovalent metal cation of the metal carboxylate contained in the structure of the hydrophilic polymer that is described later. As a result, the hydrophilic polymer loses its hydrophilicity and is converted into a hydrophobic polymer structure. Therefore, when heated such that heat is applied image-wise according to the digital signals of a computer or the like, the above-mentioned reaction proceeds only in the heated area and a latent image in image-wise hydrophobization is formed. A developing treatment removes by dissolution the hydrophilic polymer in the area not heated, i.e., the area not hydrophobized and destined to become a non-image area, so that an image area having affinity for ink is formed.

Further, when the image recording layer uses as a binder polymer a crosslinked hydrophilic polymer that is described later in the second aspect, the image recording layer surface can maintain hydrophilicity despite its insolubility inherent to the crosslinked structure. Accordingly, the area that is not heated maintains its hydrophilicity and forms a non-image area in a stable manner. On the other hand, the heated area forms a complex in the same way as above and is converted into a hydrophobic area, i.e., an area having affinity for ink, so that an image area can be formed. A three-dimensionally crosslinked hydrophilic polymer is also preferable.

As a result, without wet development processing, a planographic printing plate can be formed directly due to the crosslinked hydrophilic polymer.

Examples of the thermal decarboxylation-type metal compound (I-a) include a metal carboxylate produced by replacing the basic component of a compound, hitherto known as a decarboxylation-type base generating agent, with a metal cation having a valency of two or more. Among these compounds, preferred examples include trichloroacetates described in U. K. Patent No. 998,949, an α-sulfonylacetates described in U. K. Patent No. 4,060,420, and propiolacetates described in JP-A No. 59-157,637.

Examples of the central metals forming these metal carboxylates include the atoms of the second to the sixth periods of the Periodic Table. Among these atoms, atoms of the third to the fifth periods are preferable. Al, Si, and Mg of the third period, Ca, Ti, Mn, Fe, Ni, Cu, Zn, and Ge of the fourth period, and Zr, In, and Sn of the fifth period are more preferable.

Heretofore, a metal chelate compound has been widely used as a compound which forms a crosslinked structure so as to form images. However, despite its excellence as a crosslinking agent, the metal chelate compound cannot provide sufficient sensitivity.

In the present invention, the use of the thermal decarboxylation-type metal compound (I-a) enables sufficient hydrophobization, i.e., image formation, of the image forming layer following the change in crosslinked structure and the enhancement of the sensitivity of the image forming layer at the same time.

In the present invention, among the above-mentioned compounds, aluminum trichloroacetate, calcium trichloroacetate, zinc trichloroacetate, aluminum phenylsulfonylacetate, calcium phenylsulfonylacetate, zinc phenylsulfonylacetate, iron phenylsulfonylacetate, calcium p-chlorophenylsulfonylacetate, aluminum p-chlorophenylsulfonylacetate, aluminum phenylpropiolate, calcium phenylpropiolate, zinc phenylpropiolate, aluminum 2,4-dichlorophenylpropiolate, and calcium 2,4-dichlorophenylpropiolate are preferable. Further, metal salts of sulfonylacetic acids represented by the following general formula (I) or (II) (thermal decarboxylation-type metal compounds (1) to (8) in Table 1) are more preferable. It should be noted, however, that the present invention is not limited to these compounds.

Structural formula I

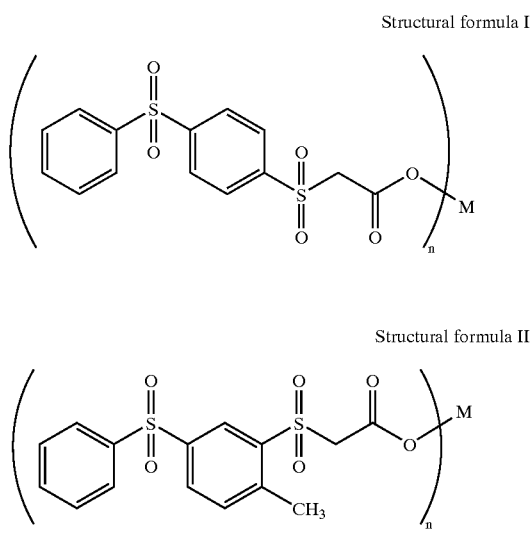

Structural formula II

TABLE 1

| Thermal decarboxylation-type metal compounds | Structural formulae | M | n |
|---|---|---|---|
| (1) | (I) | Ca | 2 |
| (2) | (I) | Mg | 2 |
| (3) | (I) | Zn | 2 |
| (4) | (I) | Al | 3 |
| (5) | (II) | Ca | 2 |
| (6) | (II) | Mg | 2 |
| (7) | (II) | Zn | 2 |
| (8) | (II) | Al | 3 |

When using the thermal decarboxylation-type metal compound (I-a), it is uniformly dispersed and contained in the hydrophilic polymer (I-b) that is described later. In particular, in order to strengthen the conversion from hydrophilicity to hydrophobicity, it is preferable that the thermal decarboxylation-type metal compound is contained in a thermoplastic polymer (d), particularly in thermally fusible hydrophobic polymer particles, described later.

The amount to be used of the thermal decarboxylation-type metal compound (I-a) is preferably 0.01 to 100 parts by weight, more preferably 0.1 to 10 parts by weight, based on 1 part by weight of the hydrophilic polymer, described later, in the image recording layer.

If the amount to be used is less than 0.01 part by weight, the conversion reaction from hydrophilicity to hydrophobicity may not sufficiently occur, whereas if the amount to be used is more than 100 parts by weight, images may become smudgy because non-image area cannot be fully hydrophilized.

<(I-b) A Hydrophilic Polymer>

The hydrophilic polymer, which is used in the first aspect of the present invention and which has two or more hydrophilic groups within the molecule and can coordinate with a polyvalent metal cation (hereinafter referred to as a hydrophilic polymer (I-b) upon occasion), is explained below.

The image recording layer of the planographic printing plate precursor of the first aspect of the present invention uses as a binder polymer the hydrophilic polymer (I-b) which has two or more hydrophilic groups within the molecule and can coordinate with a polyvalent metal cation which is released from the thermal decarboxylation-type metal compound.

The hydrophilic polymer is a polymer which is comprised of a carbon to carbon bond chain and has as side chains thereto two or more hydrophilic functional groups of one or more kinds selected from a hydroxyl group, carboxyl group, a sulfonic acid group, a phosphoric acid group, a phosphonic acid group, and salts of these acid groups.

An example of the hydrophilic polymer (I-b) is a hydrophilic polymer having at least one kind of hydrophilic functional group selected from a hydroxyl group, a carboxylic acid group, a sulfonic acid group, a phosphoric acid group, a phosphonic acid group, and salts of these acid groups. Examples of the hydrophilic polymer include polymeric compounds which are based on polymers such as poly(meth)acrylates, polyoxyalkylenes, polyurethanes, polymers prepared by a ring-opening and addition polymerization of epoxy groups, poly(meth)acrylic acids, poly (meth)acrylamides, polyesters, polyamides, polyamines, polyvinyls, polysaccharides, and a combination of these compounds. Further, the structure of the polymeric compound may contain an amido group, a polyoxyalkylene group, and the like.

The amount of the hydrophilic polymer (I-b) to be used in the first aspect of the present invention is preferably 5 to 99% by weight, more preferably 2 to 90% by weight, based on the weight of the total solids of the image recording layer.

If the amount to be used is less than 5% by weight, image areas may become smudgy because non-image areas are not sufficiently hydrophilized, whereas if the amount to be used is more than 99% by weight, the conversion reaction from hydrophilicity to hydrophobicity may not sufficiently occur.

When heated, the image recording layer of the planographic printing plate precursor of the first aspect of the present invention is rendered hydrophobic by coordinating with a polyvalent cation released from the thermal decarboxylation-type metal compound(I-a). By contrast, the image recording layer in the area not heated maintains the hydrophilicity, which allows the layer to be removed by dissolution when a wet developing treatment is carried out after image recording so that the substrate is exposed. The substrate area thus exposed forms a non-image area holding dampening water, while the heated area holding recorded images is retained on the substrate and forms an image area having affinity for ink.

A hydrophilic polymer (I-b) includes all of preferred or specific examples of a crosslinked hydrophilic polymer (II-b) described later and the crosslinked hydrophilic polymer (II-b) is preferably used in the case where wet development processing is not required.

<(II-a) A Metal Complex Compound>

A metal complex compound (II-a) to be used in the second aspect of the present invention is explained below.

Examples of the form of the metal complex compound (II-a) (hereinafter referred to as metal complex (II-a) upon occasion) contained in the image recording layer of the planographic printing plate precursor (hereinafter simply referred to as printing plate precursor upon occasion) of the present invention include metal diketenates(a-1), metal alkoxides(a-2), metal carboxylates(a-3), and so on. Among these compounds, the metal diketenate(a-1) is particularly preferable.

Specific examples of the chelate portion (ligand) constituting the metal diketenates (a-1) include 2,4-pentanedionate (acetylacetonate), fluoropentanedionate, 2,2,6,6-tetramethyl-3,5-heptanedionate, benzoylacetonate, thenoyltrifluoroacetonate, 1,3-diphenyl-1,3-propanedionate, methylacetoacetate, ethylacetoacetate, methacryloxyethylacetoacetate, allylacetoacetate, and so on.

Examples of the central metal of the metal complex compound (II-a) include the atoms of the second to the sixth periods of the Periodic Table. Among these atoms, metals and semiconductive atoms of the third to the fifth periods are preferable. Al, Si, and Mg of the third period, Ca, Ti, Mn, Fe, Co, Ni, Cu, Zn, and Ge of teh fourth period, and Zr, In, and Sn of the fifth period are particularly preferable.

Specific examples of the metal diketenate (a-1) include acetylacetonates(pentanedionates), ethylacetoacetates (hexanedionates), propylacetoacetonates(heptanedionates), tetramethylheptanedionates, benzylacetonates, and so on which are coordinated by aluminum, iron(III), manganese, cobalt, nickel, titanium, copper, and zirconium. Among these compounds, iron(III) acetylacetonate, aluminum acetylacetonate, and titanium acetylacetonate are particularly preferable.

Specific examples of the metal alkoxides (a-2) include tetra-n-butyl titanate, tetrastearoyl titanate, butyl titanate dimer, aluminum oxide isopropylate, tetra-n-butoxy zirconium, and so on.

Specific examples of the metal carboxylates (a-3) include aluminum oxide octoate, aluminum oxide stearate, zirconyl octylate, zirconyl stearate, and so on.

Other usable example is a ligand-having compound containing a mixture of the metal diketenates (a-1), the metal carboxylates (a-3), and alkylmetals. Specific examples of this compound include dipropoxy-bis(acetylacetonate) titanium, dipropoxytitanium-bis(ethylacetoacetate), dipropoxytitanium-bis(lactate), tri-n-butoxytitanium monostearate, isopropyltristearoyl titanate, aluminum dibutoxide monomethylacetoacetate, and so on.

The amount of the metal complex (II-a) to be used in the second aspect of the present invention is preferably within a range of 5 to 300% by weight, more preferably within a range of 10 to 200% by weight, based on the weight of the hydrophilic polymer (II-b) which can coordinate with the metal generated from the metal complex compound by the action of heat and has two or more hydrophilic groups within the molecule and whose main chains are crosslinked. If the amount to be used is less than 5% by weight, the images to be formed may be defective because the degree of hydrophobicity is insufficient, whereas if the amount to be used is more than 300% by weight, the excess of the metal complex may adversely affect the image formation.

<(II-b) A Crosslinked Hydrophilic Polymer>

Next, the hydrophilic polymer, which is used in the image recording layer of the planographic printing plate precursor according to the second aspect of the present invention, i.e., the hydrophilic polymer (II-b), having within the molecule two or more groups, and which can coordinate with a metal generated from the metal complex compound by the action of heat and are hydrophilic, and having main chains crosslinked (hereinafter referred to as (II-b) a crosslinked hydrophilic polymer upon occasion), is explained below. The crosslinked hydrophilic compound (II-b), which is used in the image recording layer of the planographic printing plate precursor according to the second aspect of the present invention, may include any of the hydrophilic polymers listed for the first aspect in so far as the main chains of the polymer are crosslinked. Any conventionally known polymer having such a structure can be used.

According to the second aspect of the present invention, for the manufacture of a non-development type planographic printing plate precursor, which does not need the wet development processing intended for removal by dissolution of the non-image area after image recording, a hydrophilic polymer, which has two or more hydrophilic groups within the same molecule and can coordinate with a polyvalent metal cation to be released from the metal complex compound and whose main chains are crosslinked, is used.

The crosslinked structure within the molecule enables maintenance of sufficient hydrophilicity and provides tough film properties. Therefore, even if the non-image area of the film is not removed by a developing treatment, plate life is not adversely affected and non-image areas do not become smudgy. Further, even if the non-image area of film is not removed by a developing treatment, the film is not dissolved in dampening water or printing ink at the time of plate making and therefore the dampening water or printing ink is not contaminated.

In particular, since the image recording layer surface is hydrophilic and the recording layer is not impaired by the dampening water for a long period of time and satisfactory excellent plate life is obtained, a hydrophilic polymer having a three-dimensional crosslinking structure. in the molecular is even more preferable.

As described above, because of the use of a polymer, which has hydrophilic groups and is crosslinked, a non-image area, which is not heated, can exist solidly as the non-image area maintaining hydrophilicity, and the area is not required to be removed by a developing treatment. On the other hand, in the area, which is heated, a polyvalent metal cation released from a metal complex compound causes a crosslinking reaction by a replacement reaction with the monovalent metal cation of the metal carboxylate group constituting the polymer to thereby form a complex. As a result, the hydrophilic group is blocked and the water absorptivity is lost by the formation of the crosslinked structure so that only the area heated by image recording forms a hydrophobic image area. The heated area is similar to the case where a developing treatment is required.

Accordingly, since the heated area alone becomes a hydrophobic area having affinity for ink whereas the rest of the area is hydrophilic, a planographic printing plate can be obtained without development processing.

The hydrophilic polymers having a three-dimensional crosslinked structure are preferably the hydrophilic polymeric compounds listed as examples or regarded as preferable for the hydrophilic polymeric compound (I-b), wherein the main chains of the polymeric compounds are crosslinked to form a three-dimensional crosslinked structure wherein network-structure is formed.

From the standpoint of crosslinking these polymeric compounds, it is preferable that the polymer contain at least one selected from an amino group, a glycidyl group, a polymerizable unsaturated double bond, a photopolymerizable double bond, and others.

More specifically, the polymer is a hydrophilic homopolymer or copolymer synthesized by using at least one hydrophilic monomer selected from hydrophilic monomers such as (meth)acrylic acid, or an alkali or amine salt thereof, itaconic acid, or an alkali or amine salt thereof, 2-hydroxyethyl (meth)acrylate, (meth)acrylamide, N-monomethylol(meth)acrylamide, N-dimethylol(meth)acrylamide, 3-vinylpropionic acid, or an alkali or amine salt thereof, vinylsulfonic acid, or an alkali or amine salt thereof, 2-sulfoethyl (meth)acrylate, polyoxyethylene glycol mono (meth)acrylate, 2-acrylamide-2-methylpropanesulfonic acid, acidphosphoxypolyoxyethylene glycol mono(meth)acrylate, allylamine or a mineral acid salt thereof, which each have at least one of a hydrophilic group such as a hydroxyl group, a carboxyl group or a salt thereof, a sulfonic acid group or a salt thereof, a phosphoric acid group or a salt thereof, an amido group, an amino group, an ether group, or the like.

The image recording layer containing the hydrophilic polymer (II-b) having a crosslinked structure may be formed by the following synthesis process. That is, a hydrophilic polymer having in the molecule thereof at least two functional groups, such as a hydroxyl group, a carboxyl group, an amino group or a salt thereof, an epoxy group, or the like, is used. By utilizing the functional groups, an addition polymerizable double bond, such as a vinyl group, an allyl group, a (meth)acryl group, or the like, or a ring-forming group, such as a cinnamoyl group, a cinnamylidene group, a cyanocinnamylidene group, a p-phenylene diacrylate group, or the like, is introduced into the polymer so as to obtain an unsaturated bond-containing polymer.

If necessary, a monofunctional or multifunctional monomer copolymerizable with the unsaturated bond, a polymerization initiator that is described later, and other components that are described later are added to the unsaturated bond-containing polymer and these substances are dissolved in a suitable solvent to prepare a dope. Optionally adjunctive components are added to the resulting solution and the solution is coated on a substrate that is described later. The coating layer may be three-dimensionally crosslinked while being dried simultaneously or after dried. In this way, the image recording layer containing a hydrophilic polymer having a crosslinked structure can be formed.

The method for coating the solution on the substrate can be appropriately selected from the coating methods that are described later.

In the case where the hydrophilic polymer is a hydrophilic polymer having an active hydrogen atom such as a hydroxyl group, an amino group, a carboxyl group, or the like, the hydrophilic polymer, an isocyanate compound or a block polyisocyanate compound, and other components that are described later are dissolved in a solvent free from an active hydrogen atom, such as tetrahydrofuran, dimethyl sulfoxide, dimethylacetamide, dimethylformamide, or the like so as to prepare a dope. The dope is coated on a substrate and the coating layer is dried or three-dimensionally crosslinked while being dried simultaneously.

In this case, a glycidyl group-containing monomer such as glycidyl (meth)acrylate or a carboxyl group-containing monomer such as (meth)acrylic acid can be used as a copolymerization component of the hydrophilic polymer.

In the case where the hydrophilic polymer is a hydrophilic polymer having a glycidyl group, a three-dimensionally crosslinked structure can be formed by utilizing a ring-opening reaction using as a crosslinking agent such compound as an α, ω-alkane- or alkenedicarboxylic acid, e.g., 1,2-ethanedicarboxylic acid and adipic acid, a polycarboxylic acid, e.g., 1,2,3-propanetricarboxylic acid and trimellitic acid, a polyamine compound, e.g., 1,2-ethanediamine, diethylenediamine, diethylenetriamine, and α, ω-bis(3-aminopropyl)-polyethyleneglycol ether, an oligoalkylene- or polyalkyleneglycol, e.g., ethyleneglycol, propyleneglycol, diethyleneglycol, and tetraethyleneglycol, and a polyhydroxy compound, e.g., trimethylol propane, glycerin, pentaerythritol, and sorbitol.

In the case where the hydrophilic polymer is a hydrophilic polymer having a carboxyl group or an amino group, a three-dimensional crosslinked structure can be formed by utilizing an epoxy ring-opening reaction using as a crosslinking agent such polyepoxy compound as ethylene- or propyleneglycol diglycidyl ether, polyethylene- or polypropyleneglycol diglycidyl ether, neopentylglycol diglycidyl ether, 1,6-hexanediol diglycidyl ether, trimethylolpropane triglycidyl ether, and the like.

In the case where the hydrophilic polymer is a polysaccharide such as a cellulosic derivative, polyvinyl alcohol or a partial saponification product thereof, a glycidol homopolymer or copolymer, or a hydrophilic polymer based on any of these compounds, a three-dimensional crosslinked structure can be formed by the introduction of a functional group capable of the crosslinking reaction according to the above-described method utilizing a hydroxy group contained in the hydrophilic polymer.

Among these three-dimensionally crosslinked polymers, a preferred polymer is one obtained by three-dimensionally crosslinking a hydrophilic homopolymer or copolymer synthesized by using at least one hydrophilic monomer selected from hydrophilic monomers such as (meth)acrylic acid, or an alkali metal salt or amine salt thereof, itaconic acid, or an alkali metal salt or amine salt thereof, 2-hydroxyethyl (meth)acrylate, (meth)acrylamide, N-monomethylol(meth)acrylamide, N-dimethylol(meth)acrylamide, an allylamine or a hydrogen halide salt thereof, 3-vinylpropionic acid, or an alkali metal salt or amine salt thereof, vinylsulfonic acid, or an alkali metal salt or amine salt thereof, 2-sulfoethylene (meth)acrylate, polyoxyethylene glycol mono(meth) acrylate, 2-acrylamide-2-methylpropanesulfonic acid, acid-phosphoxypolyoxyethylene glycol mono(meth)acrylate, and allylamine or a hydrogen halide acid salt thereof which each have a hydrophilic group such as a carboxyl group or a salt thereof, a sulfonic acid group or a salt thereof, a phosphoric acid group or a salt thereof, an amino group or a salt thereof, a hydroxyl group, an amido group. an ether group, or the like, or alternatively, a hydrophilic polymer composed of polyoxymethylene glycol or polyoxyethylene glycol in the same way as above.

The amount to be used of the three-dimensionally crosslinked polymer is preferably within a range of 0.1 to 90% by weight, more preferably within a range of 1 to 60% by weight, based on the weight of the total solids of the image recording layer.

If the amount to be used is outside the range, a high level of discrimination (i.e., a large difference of hydrophobic property between exposed area and unexposed area) may not be obtained.

Examples of suitable known crosslinked polymers usable as the crosslinked hydrophilic polymer (II-b) in the second aspect of the present invention include (1) a polymer which forms a hydrophilic layer and is composed of a crosslinked polymer containing metal colloids as described in WO 98/40212, (2) a polymer which forms a hydrophilic layer and is composed of a condensation product made from an organic hydrophilic polymer and a silane coupling agent as described in Registered U.S. Pat. No. 2,592,225, and (3) a polymer which forms a hydrophilic layer and is composed of a crosslinked organic polymer as described in JP-A Nos. 10-6,468 and 10-58,636. In particular, a hydrophilic polymer illustrated in (3) a hydrophilic layer composed of a crosslinked organic polymer is preferable for use in the present invention.

<(c) A Substance Capable of Converting Light to Heat>

In the first aspect and the second aspect of the present invention, the incorporation of a substance (c) capable of converting light to heat, in addition to the aforementioned two components, into the recording layer of the planographic printing plate precursor makes the recording layer writable with active light such as an infrared laser in addition to writability by heating by a thermal head or the like. Therefore, the incorporation of the substance (c) capable of converting light to heat is preferable. When making the planographic printing plate precursor of the present invention a laser-responsive type of planographic printing plate precursor capable of image formation by irradiation with laser light, it is necessary to use a substance which absorbs the irradiated laser light in a highly efficient manner and converts the laser energy to heat.

Any substance, which can absorb light such as ultraviolet light, visible light, infrared light, white light, and the like and can convert the light to heat, can be used as the substance capable of converting light to heat. Examples of the substance include carbon black, carbon graphite, a pigment, a phthalocyanine-based pigment, iron powder, graphite powder, iron oxide powder, lead oxide, silver oxide, chromium oxide, iron sulfide, chromium sulfide, and so on.

Among these substances, a dye, a pigment, or a metal, which effectively absorbs infrared rays in a wavelength region of 760 to 1200 nm, is preferable.

The dyes can be commercially available dyes and known dyes described in, for example, "Handbook of Dyes", edited by Association of organic Synthesis (Yuki Gosei Kagaku Kyokai) (1970). Specific examples of the dyes include azo dyes, azo dyes in the form of a metal complex salt, pyrazolone azo dyes, anthraquinone dyes, phthalocyanine dyes, carbonium dyes, quinoneimine dyes, methine dyes, cyanine dyes, and dyes in the form of a metal thiolate complex.

Among these dyes, preferred examples of the dyes include cyanine dyes described in, e.g., JP-A Nos. 58-125, 246; 59-84,356; 59-202,829; and 60-78,787, methine dyes described in, e.g., JP-A Nos. 58-173,696; 58-181,690; and 58-194,595, naphthoquinone dyes described in, e.g., JP-A Nos. 58-112,793; 58-224,793; 59-48,187; 59-73,996; 60-52, 940; and 60-63,744, squarylium dyes described in JP-A No. 58-112,792, and cyanine dyes described in U. K. Patent No. 434,875.

Other suitable compounds are a near-infrared absorbing sensitizer described in U.S. Pat. No. 5,156,938, a substituted arylbenzo(thio)pyrylium salt described in U.S. Pat. No. 3,881,924, a trimethinethiapyrylium salt described in JP-A No. 57-142,645 (U.S. Pat. No. 4,327,169), pyrylium compounds described in JP-A Nos. 58-,181,051; 58-220,143; 59-41,363; 59-84,248; 59-84,249; 59-146,063; and 59-146, 061, a cyanine dye described in JP-A No. 59-216,146, a pentamethinethiopyrylium salt described in U.S. Pat. No. 4,283,475, and pyrylium compounds described in Japanese Patent Application Publication (JP-B) Nos. 5-13,514 and 5-19, 702.

Further examples of preferred dyes are near-infrared absorbing dyes represented by the formula (I) or (II) in U.S. Pat. No. 4,756,993.

Among these dyes, cyanine dyes, squarylium dyes, pyrylium dyes, and nickel thiolate complexes are more preferable.

The pigments suitable for use in the present invention are commercially available pigments and those described in "Color Index (C.I.) Handbook", "Latest Pigment Handbook" (Saishin Ganryo Binran) edited by Japan Association of Pigment Technologies (Nihon Ganryo Gijutsu Kyokai) (1977), "Latest Pigment Application Technologies" (Saishin Ganryo Oyo Gijutsu), CMC, 1986, and "Printing Ink Technologies" (Insatsu Inki Gijutsu), CMC, 1984. Examples of the pigments include black pigments, yellow pigments, orange pigments, brown pigments, red pigments, purple pigments, blue pigments, green pigments, fluorescent pigments, metal powder pigments, and polymers containing chemically combined dyes.

Specific examples of the pigments are insoluble azo pigments, azo lake pigments, condensed azo pigments, chelated azo pigments, phthalocyanine based pigments, anthraquinone based pigments, perylene and perinone based pigments, thioindigo based pigments, quinacridone based pigments, dioxazine based pigments, isoindolinone based pigments, quinophthalone based pigments, dyed lake pigments, azine pigments, nitroso pigments, nitro pigments, natural pigments, fluorescent pigments, inorganic pigments, carbon black, and the like. Among these pigments, carbon black is preferable.

These pigments may be used without being surface-treated or may be used after being surface-treated. Possible surface treatments include a treatment wherein a resin or a wax is coated on the surface of the pigments, a treatment wherein a surfactant is adhered to the surface of the pigments, and a treatment wherein a reactive substance (e.g., a silane coupling agent, an epoxy compound, or a polyisocyanate) is bound to the surface of the pigments. These surface-treating methods are described in "Properties and Applications of Metal Soaps" (Sachi Shobo Co., Ltd.), "Printing Ink Technologies" (Insatsu Inki Gijutsu), CMC, 1984, and "Latest Pigment Application Technologies" (Saishin Ganryo Oyo Gijutsu), CMC, 1986.

The diameter of the pigments is preferably 0.01 to 10 $\mu$m, more preferably 0.05 to 1 $\mu$m, and most preferably 0.1 to 1 $\mu$m.

If the diameter is less than 0.1 $\mu$m, the dispersion stability of the dispersion in a coating liquid for the image recording layer may be insufficient, whereas, if the diameter is greater than 10 $\mu$m, the uniformity of the image recording layer may be impaired.

A known dispersing technology employed in the preparation of ink, toners, and the like can also be used for the purpose of dispersing the pigments. Examples of the dispersing machine include an ultrasonic wave dispersing machine, a sand mill, an attritor, a pearl mill, a super mill, a ball mill, an impeller, a disperser, a KD mill, a colloid mill, a dynatron, a three-roller mill, a pressurized kneader, and the like. Details of these dispersing technologies are described in "Latest Pigment Application Technologies" (Saishin Ganryo Oyo Gijutsu), CMC, 1986.

In the first aspect of the present invention, the amount added of the dye or the pigment is preferably 0.01 to 50% by weight, more preferably 0.1 to 10% by weight, most preferably 0.5 to 10% by weight in the case of the dye, and most preferably 3.1 to 10% by weight in the case of the pigment, based on the weight of the total solids of the image recording layer.

If the amount added of the dye or the pigment is less than 0.01% by weight, the sensitivity may decrease, whereas, if the amount is more than 50% by weight, non-image areas may become smudgy at the time of printing.

In the second aspect of the present invention, the amount added of the dye or the pigment is preferably 0.1 to 30% by weight based on the weight of the total solids of the image recording layer. If the amount added of the dye or the pigment is less than 0.1% by weight, the sensitivity decreases, whereas, if the amount is more than 30% by weight, non-image areas become smudgy at the time of printing.

<(d) A Thermoplastic Polymer>

It is preferable that the image recording layers of the planographic printing plate precursors of the first aspect and the second aspect of the present invention further contain a thermoplastic polymer. The addition of the thermoplastic polymer causes thermal fusion and adhesion of the polymer inside the layer so that the hydrophobizing effect is enhanced. The metal compound and metal complex compound in the first aspect and the second aspect is preferably contained in the thermoplastic polymer(d), particularly in a thermally fusible hydrophobic polymer particles.

The use of the thermoplastic polymer is effective particularly in manufacture of the planographic printing plate precursor of the second aspect requiring no development processing. The use of the thermoplastic polymer is effective also in manufacture of other planographic printing plate precursors requiring development processing because the thermoplastic polymer is useful in enhancing the affinity for ink in the image area.

Therefore, the thermoplastic polymer needs to be present uniformly in the layer, and, in this regard, it is preferable to use a thermoplastic polymer in the form of particles (hereinafter referred to as "thermoplastic polymer particles" upon occasion). In addition, in order to upgrade the effect, the glass transition point of the thermoplastic polymer is preferably 10 to 150° C. and more preferably 10 to 120° C.

If the glass transition point of the thermoplastic polymer is below 10° C., the particles may adhere to each other by fusion and a recording layer having well dispersed particles can not be formed in the process wherein the recording layer is formed by coating a coating liquid containing the polymer particles on a substrate and drying the coating layer, in the case where each particle is not perfectly isolated by a binder resin.

On the other hand, if the glass transition point of the thermoplastic polymer is above 150° C., the thermal fusion of the thermoplastic particles is so difficult to occur that the formation of tough images is difficult by a laser having a relatively small output power.

Examples of the thermoplastic polymer include hydrophobic polymers such as polyethylene, polyvinyl chloride, polymethyl (meth)acrylate, polyethyl (meth)acrylate, polyvinylidene chloride, polyacrylonitrile, polyvinylcarbazole, and copolymers thereof. Among these polymers, polyethylene is preferable.

The molecular weight of the thermoplastic polymer is preferably 5,000 to 1,000,000.

The diameter of the particles of the thermoplastic polymer is preferably 0.01 to 50 $\mu$m, more preferably 0.05 to 10 $\mu$m, and most preferably 0.05 to 2 $\mu$m.

It is believed that the larger the particle diameter, the smaller the resolution of the produced planographic printing plate will be. On the contrary, if the particle diameter is too small, the image formability tends to become poor because the discrimination between hydrophilicity and hydrophobicity is lessened.

From the standpoint of stability, it is preferable to use the fine particles of the thermoplastic polymer in a state of an aqueous dispersion comprising the particles dispersed uniformly in an aqueous coating liquid. Such an aqueous dispersion of polymer particles can be prepared by a method described in U.S. Pat. No. 3,476,937.

An example of other methods for preparing the aqueous dispersion comprises the steps of dissolving a hydrophobic thermoplastic polymer in an organic solvent not miscible with water, dispersing the resulting solution in water or an aqueous medium, and removing the organic solvent by evaporation.

In the first aspect, the amount added of the thermoplastic polymer is preferably 20 to 65% by weight, more preferably 25 to 55% by weight, and most preferably 30 to 45% by weight based on the weight of the total solids of the image recording layer.

In the second aspect, the amount added of the thermoplastic polymer is preferably 1 to 80% by weight, more preferably 5 to 55% by weight, and most preferably 10 to 40% by weight based on the weight of the total solids of the image recording layer. In the first aspect and the second aspect, if the amount added of the thermoplastic polymer particles is too small, the expected effect of adding the polymer is insufficient with respect to the enhancement of hydrophobicity of exposed areas. On the other hand, if the amount added of the thermoplastic polymer particles is too large, the hydrophilic layer of unexposed areas is adversely affected to an extent that ink receptivity is created in non-image regions and the non-image areas may become smudgy.

According to the image recording layer incorporating particles of the thermoplastic polymer(d), a pattern region which forms an image of the layer is directly heated or the layer is exposed or the layer is exposed while being held in contact with an original containing a pattern region capable of converting light to heat. As a result, in the image recording layer, the thermoplastic polymer particles in the region, which has been heated or exposed image-wise, are softened or melted so that this region alone is solidified after the completion of the heating. In this way, the hydrophobicity of the region is enhanced.

<Other Components>

In the present invention, besides the above-described essential components and preferred components, a variety of known additives can be used if necessary in so far the effect of the present invention is not impaired.

For example, a dye, which has a large percentage of absorption in a visible light region, can be used as an image coloring agent Specific examples include Oil Yellow No. 101, Oil Yellow No. 103, Oil Pink No. 312, Oil Green BG, Oil Blue BOS, Oil Blue No. 603, Oil Black BY, Oil Black BS, and Oil Black T-505 (all manufactured by Orient Chemical Industries, Co., Ltd.), Victoria Pure Blue, Crystal Violet(C. I. 42555), Methyl Violet(C. I.42535), Ethyl Violet (C. I.42600), Rhodamine B(C. I. 145170B), Malachite Green(C. I. 42000), Methylene Blue(C. I. 52015), and the like along with dyes described in JP-A No. 62-293,247.

It is preferable to add the dyes because these dyes fade after laser exposure and allows easy discernment between image and non-image areas.

The amount added of the dye is preferably 0.01 to 10% by weight based on the weight of the total solids of the image recording layer.

In addition, in order to increase mechanical strength and porosity of the recording layer, colloidal silica can be incorporated into the recording layer. The colloidal silica to be used has an average particle diameter of, for example, 40 nm or less. More specifically, commercially available colloidal silica having an average diameter of, for example, 20 nm and in the form of an aqueous dispersion can be incorporated directly into the coating liquid for the recording layer. Further, inert particles which have particle diameters larger than those of colloidal silica and are exemplified by, silica produced according to Stoeber, J. Colloid and Interface Sci., vol. 26 (1968), 62-69 and alumina particles, titanium dioxide particles, or particles of other heavy metal oxides , having an average particle diameter of at least 100 nm, can also be used in the same way. The incorporation of these fine particles into the recording layer creates uniform and uneven concavities and convexities of microscopic dimensions on the layer surface. These concavities and convexities function as storing sites of dampening water in the background area (non-image region, i.e., hydrophilic region).

Further, in order to broaden the latitude of stable printing conditions, the image recording layer may contain a nonionic surfactant as described in JP-A Nos. 62-251,740 and 3-208,514, and an amphoteric surfactant as described in JP-A Nos. 59-121,044 and 4-13,149.

Specific examples of the nonionic surfactant include sorbitan tristearate, sorbitan monopalmitate, sorbitan trioleate, monoglyceride stearate, and polyoxyethylene nonylphenyl ether.

Specific examples of the amphoteric surfactant include alkyldi(aminoethyl)glycine, hydrochloric acid salt of alkylpolyaminoethylglycine, 2-alkyl-N-carboxyethyl-N-hydroxyethylimidazolinium betaine, and N-tetradecyl-N,N-betaine (e.g., Amogen K (trade name) manufactured by Daiichi Kogyo Seiyaku Co., Ltd.).

The preferred amount added of the nonionic surfactant and the amphoteric surfactant are each 0.05 to 15% by weight, more preferably from 0.1 to 5% by weight, based on the weight of the total solids of the image recording layer.

If necessary, in order to impart flexibility to the image recording layer after drying, a plasticizer may be incorporated into the layer.

Examples of the plasticizer include polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate, and an oligomer or a polymer of acrylic acid or methacrylic acid.

In addition to the above-described substances, other substances, such as an epoxy compound, vinyl ethers, and a phenolic compound having a hydroxymethyl group and a phenolic compound having an alkoxymethyl group as described in Japanese Patent Application No. 7-18,120, may also be added.

Further, in order to increase the strength of the image recording layer, other polymeric compound may also be added.

Normally, the planographic printing plate precursor of the present invention can be manufactured by coating a coating liquid for the image recording layer, which coating liquid is prepared by dissolving or dispersing the above-mentioned components in a solver, on a suitable substrate.

Examples of the solvent include ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethyl sulfoxide, sulfolane, γ-butyrolactone, toluene, and water. It should be noted, however, that the present invention is not limited to these solvents.

These solvents may be used singly or in a combination of two or more.

The concentration of the total solid components (constituent components and other components) in the solvent is preferably 1 to 50% by weight.

The coated amount (solids) after coating and drying on the substrate is preferably 0.5 g to 5.0 g/m$^2$.

The coating liquid for image recording layer can be applied by various methods. Examples of the methods include bar coating, rotational coating, spraying, curtain coating, dipping, air-knife coating, blade coating, and roll coating.

In order to improve the coatability, the coating liquid for image recording layer of the planographic printing plate precursor of the present invention may contain a surfactant such as a fluorine-based surfactant described in JP-A No. 62-170,950.

The preferred amount added of the surfactant is 0.01 to 1% by weight, more preferably 0.05 to 0.5% by weight, based on the weight of the total solids of the image recording layer.

<Substrate>

A substrate which can be used in the present invention is preferably a dimensionally stable plate. Specific examples of the substrate include paper, paper laminated with a plastic (e.g., polyethylene, polypropylene, and polystyrene), plates of metals such as aluminum, zinc, and copper, films of plastics such as diacetylcellulose, triacetylcellulose, cellulose propionate, cellulose butyrate, cellulose butyrate acetate, cellulose nitrate, polyethylene terephthalate, polyethylene, polystyrene, polypropylene, polycarbonate, and polyvinyl acetal, and paper or plastic films laminated or vapor-deposited with the aforementioned metals. Preferred examples include polyethylene terephthalate films, cellulose acetate films, and paper coated with a polyolefin (e.g., polyethylene). Besides, the substrate can be coated with a first undercoat layer containing, for example, a latex of copoly (vinylidene chloride/methyl methacrylate/itaconic acid) and silica so that the adhesion between a hydrophilic layer contiguous to the undercoat layer and the substrate is improved.

The thickness of the substrate is preferably 0.1 to 0.6 mm, more preferably 0.15 to 0.4 mm, and most preferably 0.2 to 0.3 mm.

When manufacturing a planographic printing plate which is not of an on-machine development type and does not require development processing, using a crosslinked hydrophilic polymer as in the second aspect, the substrate surface does not need to be hydrophilic.

On the other hand, when manufacturing an on-machine developing type planographic printing plate requiring development processing in the first aspect using a non-crosslinked hydrophilic polymer, the substrate surface needs to be hydrophilic. In this regard, it is preferable to use a hydrophilic substrate which has undergone the following hydrophilization treatment.

As necessary, the substrate undergoes a surface treatment such as a hydrophilization treatment.

In the case of substrate whose surface is aluminum in particular, it is preferable that the surface undergoes a surface treatment such as graining, immersion in an aqueous solution of, for example, sodium silicate, potassium fluorozirconate, or a phosphate, or anodizing.

Preferred examples include an aluminum plate treated by a method wherein the aluminum plate after graining is immersed in an aqueous solution of sodium silicate as described in U.S. Pat. No. 2,714,066, and an aluminum plate treated by a method wherein the aluminum plate after anodizing is immersed in an aqueous solution of an alkali metal silicate as described in U.S. Pat. No. 3,181,461.

The anodizing is performed, for example, by applying an electric current, using the aluminum plate as an anode, in an electrolyte solution comprising a single, or two or more aqueous or nonaqueous solutions of an inorganic acid such as phosphoric acid, chromic acid, sulfuric acid, and boric acid, an organic acid such oxalic acid and sulfamic acid, or a salt thereof.

Also, electrodeposition of a silicate as described in U.S. Pat. No. 3,658,662 is effective.

The purposes of these hydrophilization treatments are to prevent an undesirable reaction between the substrate surface and the image recording layer formed thereon and to increase the adhesion between the image recording layer and the substrate surface, in addition to the hydrophilization of the substrate surface.

Prior to the graining of the aluminum plate, it is also possible to carry out a pretreatment to remove any rolling oil from the surface of the aluminum plate or to clean the surface of the aluminum.

For the purpose of removing the rolling oil, a method using a solvent such as trichloroethylene, a surfactant, or the like is widely employed. For the purpose of cleaning the surface, a method using an alkaline etching agent such as sodium hydroxide, potassium hydroxide, or the like is widely employed.

The graining (surface-roughening) of the aluminum plate may be performed by a method appropriately selected from a variety of methods. Examples of these methods include a method wherein the surface is mechanically roughened, a method wherein the surface is roughened by being electrochemically dissolved, and a method wherein the surface is selectively dissolved in a chemical way.

Examples of the mechanical methods include ball abrasion, blasting abrasion, and brush abrasion wherein the surface is abraded with a nylon brush using a water-dispersed slurry of an abrasive such as pumice. A preferred example of the chemical method is immersion in a saturated aqueous solution of an aluminum salt of a mineral acid as described in JP-A No. 54-31,187.

A preferred electrochemical method is electrolysis by an a. c. current in an acidic electrolyte solution of hydrochloric acid, nitric acid, or a combination thereof.

Among these methods for roughening the surface of aluminum, a method comprising a combination of mechanical roughening and electrochemical roughening as described in JP-A No. 55-137,993 is preferable because this method increases the bonding strength of an image recording layer to the substrate.

Desirably, the graining is performed in such a way that the average roughness (Ra) along the center line on the aluminum plate is 0.3 to 1.0 $\mu$m.

After the graining, the aluminum plate is subjected to water-rinsing or chemical etching, if necessary.

When a chemical etching treatment is employed, the treating solution for etching is usually selected from an aqueous solution of a base or and acid capable of dissolving aluminum. After the treatment, the etched surface must not have a coating film formed thereon which derives from the components of the etching solution and is different from aluminum.

Examples of the etching agents as basic aqueous solutions include aqueous solutions of sodium hydroxide, potassiumhydroxide, trisodiumphosphate, disodiumphosphate, tripotassium phosphate, and dipotassium phosphate. Examples of the etching agents as acidic aqueous solutions include aqueous solutions of sulfuric acid, persulfuric acid, phosphoric acid, hydrochloric acid, and salts thereof. However, salts of metals, such as zinc, chromium, cobalt, nickel, and copper, having an ionizing tendency lower than that of aluminum, are not desirable because these salts produce an unnecessary film on the etched surface.

Desirably, the concentration and temperature of the etching solution employed in the treatment are set such that the dissolution rate of aluminum or an aluminum alloy is 0.3 to 40 g/m$^2$ for each minute of immersion. However, a higher or lower dissolution rate may be adopted.

The etching can be performed either by immersing an aluminum plate in the etching solution or by coating the etching solution on the aluminum plate.

The desirable etched amount by the etching treatment is 0.5 to 10 g/m$^2$.

Because of its higher etching speed, the use of an aqueous solution of a base as a etching solution is preferable. In this case, since smut is formed, a desmutting treatment is usually employed.

Examples of the acid to be used for the desmutting treatment include nitric acid, sulfuric acid, phosphoric acid, chromic acid, hydrofluoric acid, and fluoroboric acid.

After the etching, the aluminum plate is subjected to water-rinsing and anodizing, if necessary.

The anodizing may be performed according to a method conventionally employed in this field. More specifically, the anodizing is performed by applying a d. c. or a. c. current to aluminum in an aqueous or nonaqueous solution of, for example, sulfuric acid, phosphoric acid, chromic acid, oxalic acid, sulfamic acid, benzenesulfonic acid, or a mixture of two or more of these acids so that an anodized film is formed on the surface of the aluminum plate.

Conditions for the anodizing vary depending on the type of electrolyte solution employed and cannot be stipulated unqualifiedly. However, usually employed conditions are as follows: concentration of the electrolyte solution is 1 to 80% by weight; temperature of the solution is 5 to 70° C.; current density is 0.5 to 60 A/dm$^2$; voltage is 1 to 100V; and duration of the electrolysis is 30 seconds to 50 minutes.

The amount of the anodized layer is preferably 1.0 g/m$^2$ or more.

If the amount of the anodized layer is less than 1.0 g/m$^2$, sufficient hardness cannot be obtained, or the non-image areas become scratched easily. In particular, in the case of a planographic printing plate precursor, so-called "scratch toning", which is caused by the adhesion of printing ink to scratch marks in printing operation, may easily occur.

Among these anodizing processes, a process, wherein an aluminum plate is anodized in sulfuric acid by a high current density as described in U. K. Patent No. 1,412,768, and a process, wherein an aluminum plate is anodized by using phosphoric acid as an electrolysis bath as described in U.S. Pat. No. 3,511,661, are preferable.

If necessary, the substrate whose surface is already anodized may be subjected to a hydrophilization treatment.

Preferred examples of the hydrophilization treatment include treating the surface with an aqueous solution of an alkali metal silicate (e.g., an aqueous solution of sodium silicate) as described in U.S. Pat. Nos. 2,714,066 and 3,181,461. According to this method, the aluminum plate is immersed or electrolytically treated in an aqueous solution of sodium silicate.

Further examples are a treatment of the surface with an aqueous solution of potassium fluorozirconate as described in JP-B No. 36-22,063 and a treatment of the surface with an aqueous solution of polyvinylphosphonic acid as described in U.S. Pat. No. 4,153,461.

<Others>

The planographic printing plate precursor according to the first aspect and the second aspect of the present invention can be prepared by forming an image recording layer on a desired substrate. If necessary, an undercoat layer may be formed on the substrate before the formation of the image recording layer.

Various organic compounds may be used as components of the undercoat layer. Examples of the organic compounds include carboxymethyl cellulose; dextrin; gum arabic; phosphonic acids having an amino group such as 2-aminoethylphosphonic acid; organic phosphonic acids which may have a substituent such as phenylphosphonic acid, naphthylphosphonic acid, alkylphosphonic acid, glycerophosphonic acid, methylenediphosphonic acid, and ethylenediphosphonic acid; organic phosphoric acids which may have a substituent such as phenylphosphoric acid, naphthylphosphoric acid, alkylphosphoric acid, glycerophosphoric acid, metylenediphosphoric acid and ethylenediphosphoric acid; organic phosphinic acids which may have a substituent such as phenylphosphinic acid, naphthylphosphinic acid, alkylphosphinic acid, and glycerophosphinic acid; amino acids such as glycine and β-alanine; and hydrochloric acid salts of amines having a hydroxyl group such as hydrochloric acid salt of triethanolamine.

These compounds may be used singly or may be used in a combination of two or more. In addition, the use of diazonium salts as undercoat layers is also preferable.

A suitable coating amount of the undercoat layer after drying is preferably 2 to 200 g/m$^2$ and more preferably 5 to 100 g/m$^2$.

If the coating amount is less than 2 g/m$^2$, satisfactory film properties may not be obtained, whereas, even if the coating amount exceeds 200 g/m$^2$, any better effect cannot be obtained.

The undercoat layer may be formed by any method described below.

For example, the above-mentioned organic compound is dissolved in water, an organic solvent such as methanol, ethanol, or methyl ethyl ketone, or a mixture thereof to prepare a coating solution, and thereafter the coating solution for the undercoat is coated on a substrate such as an aluminum plate to provide a layer which is then dried. Alternatively, the above-mentioned organic compound is dissolved in water, an organic solvent such as methanol, ethanol, or methyl ethyl ketone, or a mixture thereof to prepare a coating solution for the undercoat, and thereafter a substrate such as an aluminum plate is immersed in the coating solution so that the organic compound is adsorbed on the surface of the substrate to form a layer which is then rinsed with water or the like and dried.

When the former method is employed, a solution containing 0.005 to 10% by weight of the organic compound is preferably used as a solution for forming the undercoat layer.

When the latter method is employed, the parameters of the conditions are as follows: concentration of the solution for the undercoat layer is 0.01 to 20% by weight and preferably 0.05 to 5% by weight; immersion temperature is 20 to 90° C. and preferably 25 to 50° C.; and immersion time is 0.1 second to 20 minutes and preferably 2 seconds to 1 minute.

The pH of the coating solution for the undercoat may be adjusted to a value within a range of 1 to 12 by use of a base such as ammonia, triethylamine or potassium hydroxide, or an acid such as hydrochloric acid or phosphoric acid.

Further, when a planographic printing plate precursor is manufactured using the image forming materials of the present invention, a yellow dye may be incorporated into the coating solution so as to improve the tone reproducibility of the planographic printing plate precursor.

The planographic printing plate precursor of the present invention can be prepared by coating a coating solution for image recording layer by a desired coating method on a desired substrate or an undercoat layer provided on the substrate as described above.

<Method for Manufacturing a Planographic Printing Plate>

On the planographic printing plate precursor of the first aspect and/or the second aspect of the present invention, images can be recorded directly by a heating device such as a thermal head according to digital signals of a computer or the like. Further, if the image recording layer contains a substance capable of converting light to heat, images can be recorded directly by scanning with a laser such as a infrared laser according to digital signals. Furthermore, recording by an ultraviolet light lamp is also possible.

Among these methods, image recording by use of an infrared laser is more preferable.

The laser light source is preferably a laser emitting infrared rays in a wavelength range of 760 to 1200 nm. A solid-state laser or a semiconductor laser emitting infrared rays in the wavelength range is more preferable.

When images are recorded by direct heating according to digital signals of a computer or the like, the heating device is, for example, a thermal head. (Process for manufacturing a planographic printing plate from planographic printing plate precursor of the first aspect).

A specific example of the process for manufacturing a planographic printing plate from a planographic printing plate precursor of the first aspect is as follows. A first process comprises irradiating a planographic printing plate precursor, comprised of a substrate having thereon an image recording layer containing a metal compound (I-a) which causes a decarboxylation reaction by heat and releases a polyvalent cation, a hydrophilic polymer (I-b) which has two or more hydrophilic groups within the same molecule and can coordinate with the polyvalent metal cation, and a substance (c) capable of converting light to heat, with an infrared laser image-wise and thereafter carrying out a developing treatment to remove the unirradiated regions by dissolution. Also preferable is a second process comprising irradiating a planographic printing plate precursor, comprised of a substrate having thereon an image recording layer containing a metal compound (I-a) which causes a decarboxylation reaction by heat and releases a polyvalent cation, a hydrophilic polymer (I-b) which has two or more hydrophilic groups within the same molecule and can coordinate with the polyvalent metal cation and whose main chains are crosslinked, and a substance (c) capable of converting light to heat, with infrared rays image-wise so that hydrophobic regions are formed on the image recording layer.

When a developing treatment is carried out as in the first process, non-image regions are removed using a developing solution that is water or an alkaline aqueous solution by dissolution so that only image areas having affinity for ink remain. In this way, a desired planographic printing plate can be prepared.

In the case where a crosslinked hydrophilic polymer is used as a binder, development processing is not necessary. The process for manufacturing a planographic printing plate in this way is described later.

The alkaline aqueous solution and a replenisher solution thereto for use in the developing treatment can be selected from aqueous solutions of conventionally known alkali substances.

Examples of the alkali substances include inorganic alkali salts such as sodium silicate, potassium silicate, sodium tertiary phosphate, potassium tertiary phosphate, ammonium tertiary phosphate, sodium secondary phosphate, potassium secondary phosphate, ammonium secondary phosphate, sodium carbonate, potassium carbonate, ammonium carbonate, sodium hydrogencarbonate, potassium hydrogencarbonate, ammonium hydrogencarbonate, sodium borate, potassium borate, ammonium borate, sodium hydroxide, ammonium hydroxide, potassium hydroxide, and lithium hydroxide; and organic alkali agents such as monomethylamine, dimethylamine, trimethylamine, monoethylamine, diethylamine, triethylamine, monoisopropylamine, diisopropylamine, triisopropylamine, n-butylamine, monoethanolamine, diethanolamine, triethanolamine, monoisopropanolamine, diisopropanolamine, ethyleneimine, ethylenediamine, and pyridine.

These inorganic alkali salts and organic alkali agents may be used singly or in a combination of two or more.

Among the developing solutions using the above-listed inorganic alkali salts and organic alkali agents, particularly preferred are aqueous solutions of alkali metal silicates such as sodium silicate and potassium silicate described in, for example, JP-A No. 54-62,004 and JP-B No. 57-7,427. This is because the developability can be easily adjusted by changing the ratio of silicon oxide $SiO_2$ to an alkali metal oxide $M_2O$ (where M stands for an alkali metal), which are components of a silicate, and the concentrations of these components.

In recent years, particularly in the plate manufacturing and printing industries, automatic developing machines for printing plates are widely used for the efficiency and standardization of plate-manufacturing works.

The automatic developing machine, which generally comprises a developing section and a post-treating section, includes a device for conveying a plate material, tanks for various treating solutions, and spraying devices. In use of the apparatus, various treating solutions that are pumped up are sprayed from nozzles for development onto a plate that has been exposed to light while the plate is fed horizontally. Recently, there has also been known a method in which a plate material is treated by being immersed and conveyed in tanks filled with treating solutions by means of guide rolls or the like disposed in the solutions. Such automatic treatments may be carried out while replenisher solutions are replenished in amounts in accordance with the amount of treatment or operational time.

In this case, an aqueous solution having an alkali strength higher than that of the developing solution is added as a replenisher solution to the developing solution so that a large amount of image forming materials can be processed without having to replace the developing solution in the developing tank for a long time. In the present invention, such a replenishing manner is preferably employed.

Various surfactants and/or organic solvents may be optionally added to the developing solution and the replenisher solution to accelerate or control developability, to improve the dispersibility of development-scum, and to improve the affinity of image areas on the plate for ink.

The surfactant is preferably is an anionic, cationic, nonionic, or amphoteric surfactant. The organic solvent is preferably benzyl alcohol or the like. The addition of polyethylene glycol or a derivative thereof, polypropylene glycol or a derivative thereof, or the like is also preferable.

Hydroquinone, resorcinol, a reducing agent based on a salt of inorganic acid, such as sodium or potassium sulfite and sodium or potassium hydrogensulfite, an organic carboxylic acid, a defoaming agent, and a softener of hard water may be added, as needed.

Preferred examples of the developing solution containing the surfactant, organic solvent, reducing agent, and others include a developing solution composition composed of benzyl alcohol, an anionic surfactant, an alkali agent, and water as described in JP-A No. 51-77,401, a developing solution composition composed of an aqueous solution containing benzyl alcohol, an anionic surfactant, water, and a water-soluble sulfite as described in JP-A No. 53-44,202, and a developing solution composition composed of an organic solvent whose solubility to water is 10% by weight or less at room temperature, an alkali agent, and water as described in JP-A No. 55-155,355.

The planographic printing plate, after development using the developing solution and the replenisher solution, is post-treated with rinsing water, a rinsing solution containing, for example, a surfactant, or a desensitizing solution containing gum arabic or a starch derivative. The post-treatment can be carried out using a combination of these treating solutions.

In addition, a so-called single-use solution system, in which a plate material is processed with a substantially fresh processing solution, can also be employed.

If desired, the planographic printing plate obtained in the above-described way can be coated with a desensitizing gum and subsequently forwarded to a printing step. (Process for manufacturing a planographic printing plate from planographic printing plate precursor of the second aspect).

In the second aspect of the present invention, since the planographic printing plate precursor uses a crosslinked hydrophilic polymer as a binder, the employment of wet development processing such as the one in the above-described first process is not necessary. When the image recording layer is subjected to image recording by use of a heating device such as a thermal head or by use of laser light, a hydrophobic region having affinity for ink (image area) is formed in the image recording layer, while the region, which has not been subjected to image recording, remains as a hydrophilic region (non-image area) capable of retaining dampening water. Therefore, after laser irradiation, the manufactured planographic printing plate can be directly set to a printing machine so that printing can be carried out.

The incorporation of (c) a substance capable of converting light to heat into the image recording layer makes the recording layer writable with light. Although the recording with light may be carried out by exposure of the entire surface through a filter provided with a suitable pattern, particularly preferable is the image recording by use of an infrared laser, e.g., a solid-state laser or semiconductor laser emitting infrared rays having wavelengths of 760 to 1200 nm. The laser exposure makes it possible to carry out desired image-wise recording directly from the digital information of a computer.

As stated above, in the second aspect of the present invention, a hydrophobic region having affinity for ink (image area) and a hydrophilic region (non-image area) capable of retaining dampening water are formed in the image recording layer after recording. Therefore, after laser irradiation, the planographic printing plate can be immediately set at a printing machine so that printing is carried out without necessitating a treatment to dissolve and develop the recording layer.

A representative process for manufacturing a planographic printing plate by using the planographic printing plate precursor of the present invention is the third aspect, wherein a heat-sensitive type planographic printing plate precursor comprised of a substrate having thereon a recording layer, containing the metal complex compound(II-a) the hydrophilic polymer (II-b) which can coordinate with the metal generated from the metal complex compound by the action of heat and has two or more hydrophilic groups within the molecule and whose main chains are crosslinked, and the substance (c) capable of converting light to heat, is exposed to infrared laser light image-wise so as to form a hydrophobic region. The planographic printing plate obtained in the above-mentioned process is set to, for example, an offset printing machine so as to produce a large number of prints. In the case, it is also very desirable that the metal complex compound (II-a) is the metal compound(I-a). This is because a planographic printing plate precursor, which does not require development processing and has very good sensitivity, can be obtained.

EXAMPLES

The present invention is further explained below by way of examples. However, it must be noted that the scope of the present invention is not limited to these examples given below. "%" in the examples always means "weight %".

Example 1

<Synthesis of Thermal Decarboxylation-type Metal Compound (1) "Illustrative Compound in Table 1">

6.8 g of 4-(sulfonylphenyl)phenylsulfonylacetic acid was dissolved in a solvent mixture of 50 ml of water and 150 ml of methanol. While being stirred, the resulting solution was added with a solution prepared by dissolving 1.76 g of calcium acetate monohydrate in 5 ml of water.

The precipitate that was formed was collected by filtration and dried. In this way, 6.73 g of a crystalline product of the thermal decarboxylation-type metal compound (1) was obtained. The melting point (decomposition) of the crystalline product was found to be 193° C. The result of infrared absorption (IR) spectrum measurement confirmed the presence of a strong absorption at 1605 $cm^{-1}$ pertaining to carboxylate.

<Synthesis of Thermal Decarboxylation-type Metal Compound (5) "Illustrative Compound in Table 1">

7.08 g of 2-methyl-5-(sulfonylphenyl) phenylsulfonylacetic acid was dissolved in a solvent mixture of 50 ml of water and 150 ml of methanol. While being stirred, the resulting solution was added with a solution prepared by dissolving 1.76 g of calcium acetate monohydrate in 5 ml of water.

The precipitate that was formed was collected by filtration and dried. In this way, 5.93 g of a crystalline product of the thermal decarboxylation-type metal compound (5) was obtained. The melting point (decomposition) of the crystalline product was found to be 185° C. The result of infrared absorption (IR) spectrum measurement confirmed the presence of a strong absorption at 1605 $cm^{-1}$ pertaining to carboxylate.

By carrying out procedures similar to the above-described synthesis procedures, crystalline products of the thermal decarboxylation-type metal compounds (2) to (4) were obtained. The results of infrared absorption (IR) spectrum measurement of each product confirmed the presence of a strong absorption at 1605 $cm^{-1}$ pertaining to carboxylate.

<Preparation of a Hydrophilic Polymer (P-1)>

5.5 g of 2-methacryloyloxyethyl isocyanate and 0.1 g of dibutyltin dilaurate were added to a solution prepared by dissolving 18.0 g of polyacrylic acid (having a molecular weight of 25,000 and manufactured by Wako Pure Chemicals Industries, Ltd.) and the resulting solution was caused to react for 3 hours.

Next, 80 equivalent % of the carboxyl group was neutralized with sodium hydroxide and acetone was added in order to precipitate a polymer. The polymer was well washed and purified. In this way, a hydrophilic polymer (P-1) was obtained.

<Preparation of a Dispersion of the Thermal Decarboxylation-type Metal Compound>

4.0 g of the illustrative thermal decarboxylation-type metal compound (1) obtained above, 6.0 g of a 10% aqueous solution of polyvinyl alcohol (trade name: PVA-405 manufactured by Kuraray Co., Ltd.), 20 g of water, and 10 g of glass beads were mixed for 15 minutes using a paint shaker. In this way, a dispersion of the thermal decarboxylation-type metal compound (1) was prepared.

<Manufacture of a Planographic Printing Plate Precursor>

First, a coating liquid (1) for image recording layer was prepared according to the following formulation.

| | |
|---|---|
| 10% aqueous solution of the hydrophilic polymer (P-1) | 20.0 g |
| Initiator A based on a water-soluble triazine given below | 0.1 g |
| Polyethylene glycol diallylate (trade name: A600 manufactured by Toagosei Chemical Industry Co., Ltd.) | 2.0 g |
| Water-dispersible carbon black (manufactured by Mikuni Shikiso Co., Ltd.) | 0.4 g |
| Dispersion of the thermal decarboxylation-type metal compound (1) | 10.0 g |
| 20% polymethyl methacrylate dispersion (having a particle diameter of 90 nm and containing polyvinyl alcohol as a stabilizer in an amount of 1% based on the content of polymethyl methacrylate) | 2.5 g |

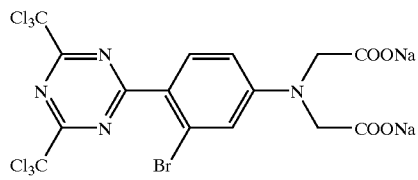

Water-soluble Triazine Initiator A

Next, the coating liquid (1) for image recording layer was coated on a 200 μm thick polyethylene terephthalate (PET) sheet by using a wired bar No. 14 and the coating layer was dried for 1 minute at 100° C. to form an image recording layer. The entire surface was exposed to UV light for 1000 counts using Eye Rotary Printer (manufactured by Eye Graphic Corp.) to obtain a planographic printing plate precursor (1) of the present invention having an image recording layer containing the hydrophilic polymer (P-1) having a crosslinked structure. The thickness of the recording layer was 3.7 μm.

<Evaluation of Sensitivity>

The planographic printing plate precursor (1) thus obtained was irradiated with an LD laser (having a laser beam diameter of 28 μm) emitting an infrared ray having a wavelength of 830 nm according to digital signals of a computer or the like. In this way, exposure to a desired image was carried out and a planographic printing plate (1) was obtained without development processing.

The laser-scanned area of the planographic printing plate (1) was observed under a microscope and the line width as an indicator of sensitivity was measured. A line width that is closer to 28 μm means higher sensitivity. The results of measurements are shown in Table 2.

<Evaluation of Printing Performance>

After the image-wise laser exposure, the planographic printing plate (1) was set directly to a Hidel SOR-M printer without development processing and 2,000 prints were obtained.

The prints were visually evaluated. Clear images were obtained in all of the prints and no stain was found in non-image areas.

Examples 2~5

Planographic printing plate precursors (2)~(5) of the present invention were obtained by carrying out the same procedure as in Example 1, except that the illustrative thermal decarboxylation-type metal compounds (2)~(5) were used respectively in place of the thermal decarboxylation-type metal compound (1) used in the dispersion (1) of the thermal decarboxylation-type metal compound of Example 1. The thicknesses of the image recording layers formed in the above-described manner were each 3.7 µm.

Planographic printing plate s (2)~(5) were manufactured using the planographic printing plate precursors (2)~(5) by the same procedure as in Example 1. Further, sensitivity measurements were conducted in the same way and 2,000 prints were produced for each plate. The results are shown in Table 2.

The prints were visually evaluated. Clear images were obtained in all of the prints and no stain was found in non-image areas.

Comparative Example 1

Planographic printing plate precursor (6) was obtained by carrying out the same procedure as in Example 1, except that iron acetylacetonate was used in place of the thermal decarboxylation-type metal compound (1) used in the dispersion (1) of the thermal decarboxylation-type metal compound of Example 1. The thickness of the image recording layer was 3.7 µm.

Planographic printing plate (6) was manufactured using the planographic printing plate precursor (6) by the same procedure as in Example 1. Further, sensitivity measurements were conducted in the same way and 2,000 prints were produced. The results are shown in Table 2.

Clear images were obtained in all of the prints and no stain was found in non-image areas. Example 6
<Manufacture of Substrate>

A 0.24 mm thick aluminum plate (JIS A 1050) was brush-grained by using the following rotating nylon brushes while supplying an aqueous suspension comprising pumice stone powder having an average particle diameter of about 2.1 µm to the aluminum plate surface.

The first brush had a bristle length of 100 mm, a bristle diameter of 0.95 mm, and a density of 70 bristles/cm$^2$. The second brush had a bristle length of 80 mm, a bristle diameter of 0.295 mm, and a density of 670 bristles/cm$^2$. The revolution number of each brush was 250 rpm.

After being brush-grained and subsequently well rinsed with water, the aluminum plate was etched by immersion in a 10% aqueous solution of sodium hydroxide at 60 °C. for 25 seconds. Thereafter, the aluminum plate was rinsed with flowing water, neutralized and washed in a 20% aqueous solution of nitric acid, and rinsed with water.

The surface of the aluminum plate was roughened in a 1% aqueous solution of nitric acid using a sinusoidal electric current at a condition of VA=12.7V employing an electric amount of 160 coulomb/dcm$^2$.

The surface roughness of the aluminum plate was measured using Surftest 501 (manufactured by Mitutoyo Co., Ltd.) and was found to be 0.79 µm (surface roughness Ra along the central line).

Next, the aluminum plate was immersed in a 1% aqueous solution of sodium hydroxide at 40° C. for 30 seconds and thereafter immersed in a 30% aqueous solution of sulfuric acid at 60° C. for 40 seconds for a desmutting treatment. After that, the aluminum plate was anodized in a 20% aqueous solution of sulfuric acid through which a d. c. current with a density of 2A/dm$^2$ was passed. This anodizing treatment was performed so that an anodized film of 1.6 g/m$^2$ was formed. In this way, a surface-treated substrate was manufactured.

The aluminum plate was then coated with a coating liquid (A) for undercoat layer having the following composition, and the coating layer was dried at 80° C. for 30 seconds. In this way, a substrate (I) having an undercoat layer was manufactured. The dry coated amount of the undercoat layer was 10 mg/M$^2$.

| [Composition of a coating liquid (A) for undercoat layer] | |
|---|---|
| β-alanine | 0.10 g |
| methanol | 40 g |
| pure water | 60 g |

<Manufacture of a Planographic Printing Plate Precursor>

First, a coating liquid (2) for image recording layer was prepared according to the following formulation.

| | |
|---|---|
| 10% aqueous solution of a sodium salt of a poly(methacrylic acid/methyl methacrylate) copolymer(acid value: 1.8 meq/g; hydrophilic polymer (P-2)) | 20.0 g |
| Water-dispersible carbon black (manufactured by Mikuni Shikiso Co., Ltd.) | 0.4 g |
| Dispersion of the thermal decarboxylation-type metal compound (1) | 10.0 g |
| 20% polymethyl methacrylate dispersion (having a particle diameter of 90 nm and containing polyvinyl alcohol as a stabilizer in an amount of 1% based on the content of polymethyl methacrylate) | 25 g |
| 10% aqueous solution of polyvinyl alcohol (trade flame: PVA-405 manufactured by Kuraray Co., Ltd.) | 20 g |

Next, the coating liquid (2) for image recording layer was coated on the substrate (I) obtained above by using a wired bar No. 14 and the coating layer was dried for 1 minute at 100° C. In this way, a planographic printing plate precursor (7) of the present invention having an image recording layer was obtained. The thickness of the recording layer was 3.0 µm.

<Measurement of Sensitivity and Evaluation of Printing Performance>

The planographic printing plate precursor (7) thus obtained was irradiated with an LD laser (having a laser beam diameter of 28 µm) emitting an infrared ray having a wavelength of 830 nm according to digital signals of a computer or the like so as to expose the surface to a desired image. After that, the plate was immersed in water and the non-image area was removed by rubbing with a sponge. In this way, a planographic printing plate (7) was obtained.

The line width of the laser-scanned area of the planographic printing plate (7) was measured as in Example 1 to obtain sensitivity. The results of measurements are shown in Table 2.

Next, the planographic printing plate (7) was set at Hidel SOR-M printer and 2,000 prints were obtained. The prints were visually evaluated.

Clear images were obtained in all of the prints and no stains were found in non-image areas.

TABLE 2

| | Compound | Hydrophilic polymeric compound | Sensitivity [µm] |
|---|---|---|---|
| Example 1 | Thermal decarboxylation-type metal compound (1) | P-1 | 26 |

TABLE 2-continued

| | Compound | Hydrophilic polymeric compound | Sensitivity [μm] |
|---|---|---|---|
| Example 2 | Thermal decarboxylation-type metal compound (2) | P-1 | 24 |
| Example 3 | Thermal decarboxylation-type metal compound (3) | P-1 | 20 |
| Example 4 | Thermal decarboxylation-type metal compound (4) | P-1 | 18 |
| Example 5 | Thermal decarboxylation-type metal compound (5) | P-1 | 18 |
| Example 6 | Thermal decarboxylation-type metal compound (1) | P-2 | 20 |
| Comparative example 1 | Fe acetylacetonate | P-1 | 15 |

As can be seen from Table 2, the planographic printing plates (1)~(5) and (7) (Example 1~6) having a thermal decarboxylation-type metal compound in the image recording layers provide high sensitivity and clear prints free from smudgy non-image areas.

On the other hand, the planographic printing plate (6) (Comparative Example 1)having no thermal decarboxylation-type metal compound in the image recording layer does not provide sufficient sensitivity.

As described above, the first aspect of the present invention makes it possible to provide a planographic printing plate precursor which can be engraved with high sensitivity by heat generated either by a heating device such as a thermal head or by light-to-heat conversion of laser light.

In addition, the first aspect of the present invention makes it possible to provide a planographic printing plate directly with particularly high sensitivity by heat generated either by a heating device such as a thermal head or by light-to-heat conversion of laser light according to digital signals of a computer or the like.

Example 7

<Preparation of a Hydrophilic Polymer (P-3)>

18.0 g of polyacrylic acid ((having a molecular weight of 25,000 and manufactured by Wako Pure Chemicals Industries, Ltd.) was dissolved in dimethylacetamide. The solution was added with 5.5 g of 2-methacryloyloxyethyl isocyanate (hereinafter abbreviated as MOI) and 0.1 g of dibutyltin dilaurate and the resulting solution was caused to react for 3 hours. Next, 80 equivalent % of the carboxyl group was neutralized with sodium hydroxide and acetone was added in order to precipitate a polymer. The polymer was well washed and purified. In this way, a hydrophilic polymer (P-3) was obtained.

<Preparation of a Dispersion of a Metal Complex>

4.0 g of aluminum complex of acetylacetone as a metal complex (Aluminum Chelate A manufactured by Kawaken Fine Chemicals Co., Ltd.), 6.0 g of a 10% aqueous solution of polyvinyl alcohol (trade name: PVA-405 manufactured by Kuraray Co., Ltd.), 20 g of water, and 10 g of glass beads were stirred for 15 minutes using a paint shaker. In this way, a dispersion of a metal complex was prepared.

<Manufacture of a Planographic Printing Plate Precursor>

Next, a coating liquid for image recording layer was prepared according to the following formulation.

| (Coating liquid for image recording layer) | |
|---|---|
| 10% aqueous solution of the hydrophilic polymer (P-3) | 20.0 g |
| Initiator A based on a water-soluble triazine | 0.1 g |
| polyethylene glycol diallylate (trade name: A600 manufactured by Toagosei Chemical Industry Co., Ltd.) | 2.0 g |
| Water-dispersible carbon black (manufactured by Mikuni Shikiso Co., Ltd.) | 0.4 g |
| Dispersion of aluminum complex of acetylacetone | 10.0 g |
| 20% polymethyl methacrylate dispersion (having a particle diameter of 90 nm and containing polyvinyl alcohol as a stabilizer in an amount of 1% based on the content of polymethyl methacrylate) | 2.5 g |

Next, the coating liquid for image recording layer was coated on a 200 μm thick polyethylene terephthalate substrate by using a wired bar No. 14 and the coating layer was dried for 1 minute at 100° C. The entire surface was exposed to UV light (for 1000 counts using Eye Rotary Printer manufactured by Eye Graphic Corp.) to obtain a heat-sensitive recording type planographic printing plate precursor having an image recording layer composed of a crosslinked polymer. The thickness of the recording layer was 3.7 μm.

Examples 8~11

Heat-sensitive planographic printing plate precursors were manufactured according to the same procedure as in Example 7, except that the dispersion was prepared by using the following compounds, respectively, in place of the aluminum complex of acetylacetone.

Example 8 aluminum tris(ethylacetoacetate) (trade name: ALCH-TR manufactured by Kawaken Fine Chemicals Co., Ltd.)

Example 9 aluminum mono (acetylacetonate)-bis(ethylacetate) (tade name: Aluminum Chelate D manufactured by Kawaken Fine Chemicals Co., Ltd.)

Example 10 tetra-n-butoxyzirconium (manufacture by Nippon Soda Co., Ltd.)

Example 11 dipropoxy-bis(acetylacetonate)titanium (trade name: Titanboard 50 manufacture by Nippon Soda Co., Ltd.)

Evaluation of Printing Performance

The planographic printing plate precursors obtained in Examples 7~11 were image-wise exposed to an LD laser emitting an infrared ray having a wavelength of 830 nm. After the exposure, the plate obtained was set to a printing machine (Hidel SOR-M manufactured by Heidelberg Corp.) directly without development processing. In this way, 2,000 prints were produced. Clear images were obtained in all of the prints and no stain was found in non-image areas irrespective of the kinds of metal complexes incorporated.

The excellent effects according to the planographic printing plate precursor, constituting the second aspect of the present invention, are that images can be formed with high sensitivity by heat or by the heat generated by light-to-heat conversion and that the printing plate precursor can be used for manufacturing a planographic printing plate directly from digital data by using an infrared laser or a thermal head without necessitating a special treatment such as wet development or rubbing after image-wise exposure. In addition, according to the process for manufacturing a planographic printing plate, constituting the third aspect of the present invention, it is possible to manufacture a planographic printing plate having excellent properties directly from digital data without necessitating a special treatment such as wet development or as rubbing after image-wise exposure.

What is claimed is:

1. A planographic printing plate precursor comprising a substrate having disposed thereon an image recording layer containing a metal compound (I-a) and a hydrophilic polymer (I-b) wherein:

the metal compound (I-a) undergoes a decarboxylation reaction by heat and thereby releases a polyvalent metal cation; and the hydrophilic polymer (I-b) has at least two hydrophilic groups within the molecule wherein the polyvalent metal cation released by heat coordinates with the hydrophilic groups of the hydrophilic polymer and forms a hydrophobic polymer.

2. A planographic printing plate precursor according to claim 1, wherein the image recording layer further contains a substance (c) that converts light to heat.

3. A planographic printing plate precursor according to claim 1, wherein the image recording layer further contains a thermoplastic polymer (d).

4. A planographic printing plate precursor according to claim 3, wherein the metal compound (I-a) is contained in particles of the thermoplastic polymer (d).

5. A planographic printing plate precursor according to claim 3, wherein the added amount of the thermoplastic polymer is 20 to 65% by weight based on the weight of total solids of the image recording layer.

6. A planographic printing plate precursor according to claim 1, wherein the hydrophilic polymer (I-b), which has at least two hydrophilic groups within the molecule is a hydrophilic polymer whose main chains are crosslinked.

7. A planographic printing plate precursor according to claim 1, wherein the metal compound (I-a) is at least one compound selected from the group consisting of aluminum trichloroacetate, calcium trichloroacetate, zinc trichloroacetate, aluminum phenylsulfonylacetate, calcium phenylsulfonylacetate, zinc phenylsulfonylacetate, iron phenylsulfonylacetate, calcium p-chlorophenylsulfonylacetate, aluminum p-chlorophenylsulfonylacetate, aluminum phenylpropiolate, calcium phenylpropiolate, zinc phenylpropiolate, aluminum 2,4-dichlorophenylpropiolate, calcium 2,4-dichlorophenylpropiolate, and metal salts of sulfonylacetic acids represented by the following general formula (I) or (II):

Structural formula I

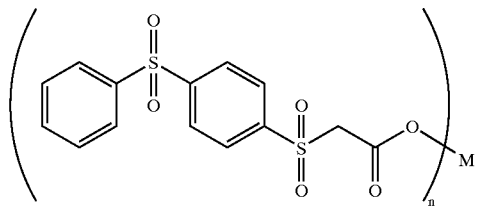

Structural formula II

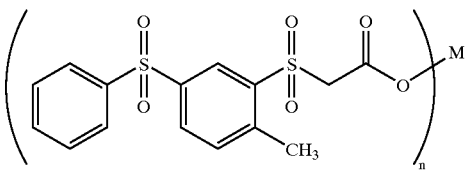

wherein M is a metal selected from the second to the sixth periods of the periodic table and n is the valence of the metal.

8. A planographic printing plate precursor according to claim 1 which can be used to manufacture a planographic printing plate directly by heat generated by light-to-heat conversion of infrared laser light.

9. A planographic printing plate precursor according to claim 1 which can be used to manufacture a planographic printing plate by heat generated by heating with a heating device.

10. A planographic printing plate precursor according to claim 1, wherein the dry coating amount (amount of solids) of the image recording layer, which is obtained by coating and drying on the substrate, is 0.5 to 5.0 g/m$^2$.

11. A planographic printing plate precursor comprising a substrate having thereon an image recording layer containing a metal complex compound (II-a) and a hydrophilic polymer (II-b) wherein:

the metal complex compound (II-a) generates metal by heat; and the hydrophilic polymer (II-b) whose main chains are crosslinked has at least two hydrophilic groups within the molecule wherein the metal released by heat coordinates with the hydrophilic polymer and forms a hydrophobic polymer.

12. A planographic printing plate precursor according to claim 11, wherein the image recording layer further contains a substance (c) that converts light to heat.

13. A planographic printing plate precursor according to claim 11, wherein the image recording layer further contains a thermoplastic polymer (d).

14. A planographic printing plate precursor according to claim 13, wherein the metal complex compound (II-a) is contained in the particles of a thermoplastic polymer (d).

15. A planographic printing plate precursor according to claim 11, wherein the metal complex compound (II-a) is a metal compound which causes a decarboxylation reaction due to heat and releases a polyvalent metal cation.

16. A planographic printing plate precursor according to claim 11 which can be used to manufacture a planographic printing plate directly by heat generated by light-to-heat conversion of infrared laser light.

17. A planographic printing plate precursor according to claim 11 which can be used to manufacture a planographic printing plate by heat generated by heating with a heating device.

18. A planographic printing plate precursor according to claim 11, wherein the hydrophilic polymer (II-b) has a three-dimensional crosslinked structure.

19. A planographic printing plate precursor according to claim 11, wherein the dry coating amount (amount of solids) of the image recording layer, which is obtained by coating and drying on the substrate, is 0.5 to 5.0 g/m$^2$.

20. A process for manufacturing a planographic printing plate, said process comprising the step of exposing a planographic printing plate precursor image-wise to infrared laser light so as to form a hydrophobic region on a surface of a planographic printing plate precursor, the planographic printing plate precursor being comprised of a substrate having thereon an image recording layer containing a metal complex compound (II-a), a hydrophilic polymer (II-b), which coordinates with the metal generated from the metal complex compound by the action of heat and which has at least two hydrophilic groups within the molecule and whose main chains are crosslinked wherein the coordination with the metal forms the hydrophobic region, and a substance (c) that converts light to heat.

* * * * *